United States Patent [19]

Trulove

[11] 4,256,321
[45] Mar. 17, 1981

[54] BICYCLE CAMPER-TRAILER

[76] Inventor: Chris D. Trulove, 2805 Catherine Way, Santa Ana, Calif. 92705

[21] Appl. No.: 924,646

[22] Filed: Jul. 14, 1978

[51] Int. Cl.³ .............................................. B62K 27/02
[52] U.S. Cl. .................................. 280/204; 135/3 A; 135/7.1 A; 220/4 F; 220/6; 296/159; 296/173
[58] Field of Search .................. 280/204, 203, 30; 135/1 A, 3 A, 4 A, 7.1 A; 220/4 F, 6; 296/156, 159, 161, 163, 165, 173

[56] References Cited

U.S. PATENT DOCUMENTS

| 2,380,045 | 7/1945 | Hope-Johnson | 296/23 R |
| 2,779,621 | 1/1957 | Vale | 135/4 A X |
| 4,079,956 | 3/1978 | Headington | 280/203 |

FOREIGN PATENT DOCUMENTS

| 1012244 | 7/1952 | France | 296/23 R |
| 1028739 | 5/1953 | France | 296/23 F |
| 1155702 | 5/1958 | France | 296/23 R |
| 285432 | 6/1928 | United Kingdom | 280/203 |

OTHER PUBLICATIONS

"Now You Can Pedal Your Tent," Washington Post Newspaper, Aug. 6, 1977.

Primary Examiner—John P. Silverstrim
Attorney, Agent, or Firm—Matthew P. Lynch

[57] ABSTRACT

A two wheeled, collapsible camper-trailer for bicycles. The trailer comprises a bottom, a pair of opposed sides hingedly secured to the bottom, an open front and a partially closed rear end. The sides of the trailer when attached to the bicycle are held in an upright, substantially parallel position by conventional fastening means. With the trailer in the collapsed position, it is to serve as a vertical supporting wall for a tent. The trailer can be constructed of wire mesh or can be constructed of rigid sheet material, such as plastic.

9 Claims, 12 Drawing Figures

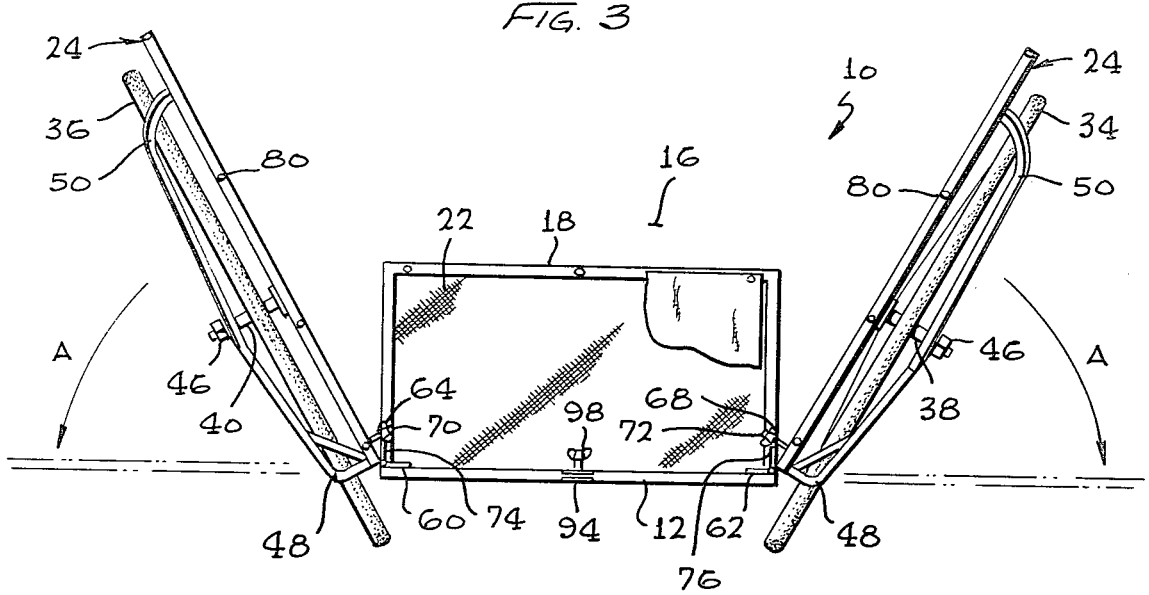
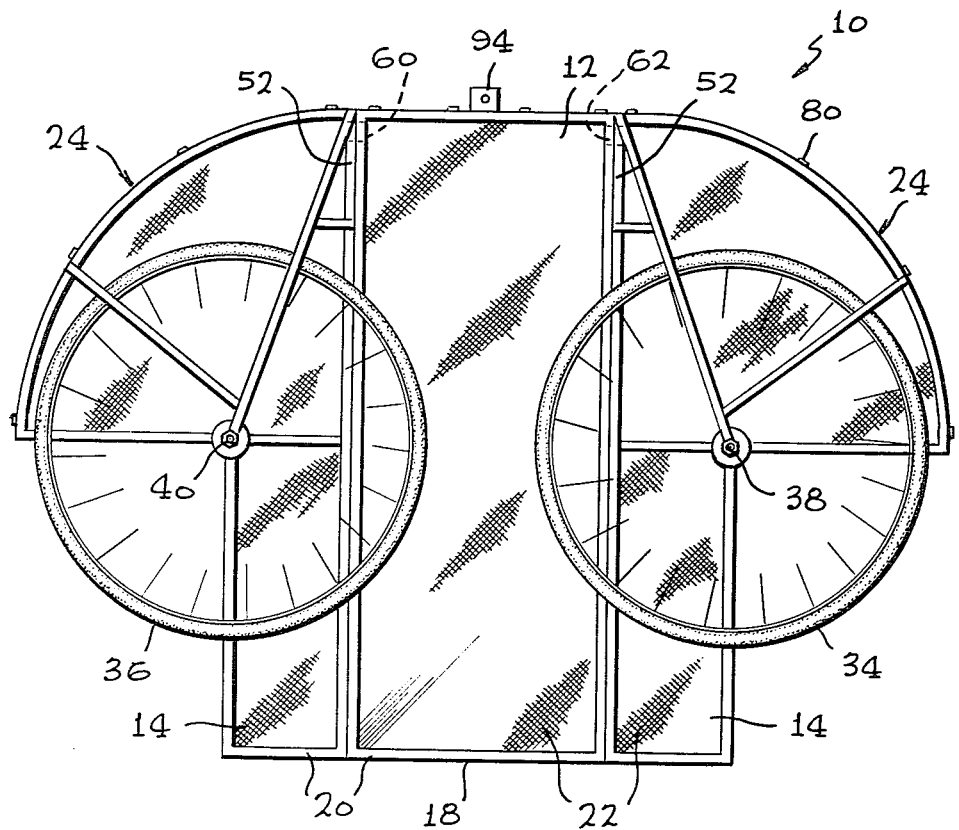

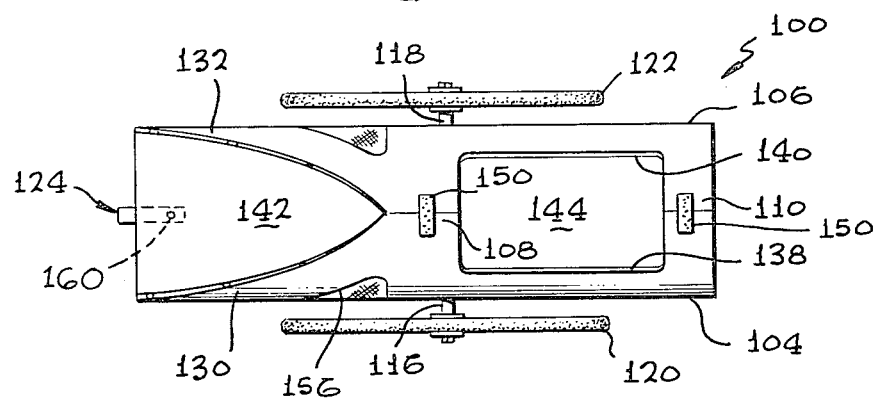
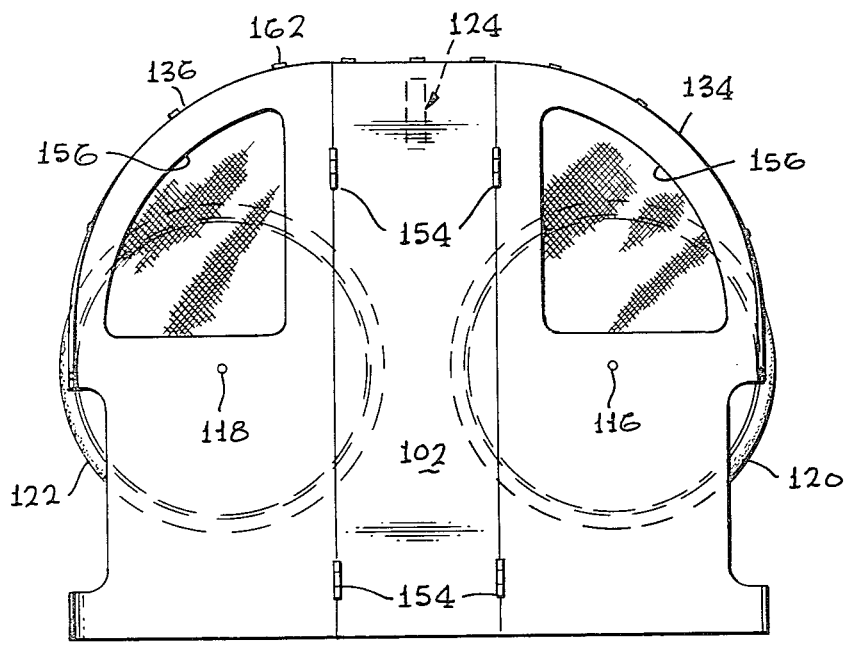
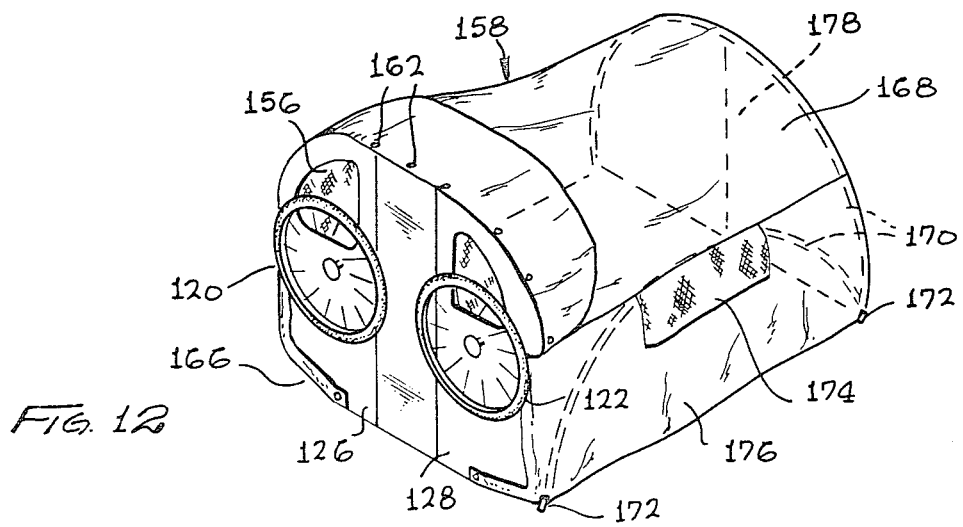

BICYCLE CAMPER-TRAILER

BACKGROUND OF THE INVENTION

1. Field of the Invention

The present invention relates generally to camper-trailers and relates more particularly to a two-wheeled, collapsible camper adapted particularly for use with bicycles and convertible from a trailer into a tent.

2. Description of the Prior Art

Already well known in the art are camper-trailers hauled, e.g. by a car or truck, and which comprises a foldable tent normally supported on the trailer bottom or bed and which may be unfolded to form a tent with the trailer or carriage serving as a support to provide a roomlike addition adjacent to and in conjunction with the trailer and with the addition outfitted as temporary living quarters. Although this type of camper is popular and widely in use, it is most unsuitable for vehicles other than cars or trucks. A camper for use with a bicycle, for example, would have to be light in weight and narrow in width; lift-weighted for reasons that the motive power for hauling or pulling the camper is provided by manpower instead of horsepower as provided by an automobile, and narrow for reasons that bicyclists generally travel alongside the traffic rather than in it, or pedal along winding and narrow bicycle paths adjacent the road. In addition to these criteria, such a camper for use with bicycles would have to be stable and free of excessive vibrations and stress to enable the cyclist to hold to the road and not be dragged off the shoulder or into the traffic.

SUMMARY OF THE INVENTION

Therefore, object of the present invention is to provide a camper-trailer particularly for use with bicycles, which is light in weight, narrow in width and yet which is sturdy and easy to maneuver.

A further object of the invention is to provide a bicycle camper-trailer which is collapsible and is easily convertible from a carriage for hauling camping and sporting equipment, food, and the like, into a tent, with the framework of the carriage or trailer serving as a frame or wall for the tent.

Yet a further object of the invention is to provide a novel bicycle camper-trailer which is made of low-cost materials, which is easy to maintain, and simple in construction.

According to the invention, such a novel bicycle camper-trailer comprises an elongated collapsible body having a bottom; a pair of opposed side walls hingedly secured to the bottom and adapted to be moved from an upright or vertical position to a horizontal position flush with the plane of the bottom; an open front end; and a semi-closed rear end; the bottom, side walls and rear end, in one embodiment of the invention, being of a wire-mesh structure supported by tubular support members while the trailer structure of the second embodiment of the invention are constructed of a double-walled, generally solid plastic material having a core sandwiched therebetween, the side walls of the trailer second embodiment defining meshed areas forming windows adjacent the front of the trailer. The side walls, in both embodiments, are foldable relative to the bottom by latch means and, upon unlocking of such latch means, the side walls may be folded to a position substantially flush with the bottom with the wheels secured to the side walls folded under the structure and extending in parallelism with the bottom. In the collapsed condition, and in the first embodiment of the trailer, the trailer frame defines a substantially flat structure while in the second embodiment of the trailer, the frame of the former defines a semi-flat structure, the configuration of the respective trailer sides being so that in the collapsed position, the flat structure assumes the approximate geometry of the cross section of an umbrella whereas the semi-flat structure assumes the configuration of the cross section of a mushroom. Typically, in the first trailer embodiment, and in the "travel" condition thereof, the trailer side walls extend in parallelism with each other. In the second trailer embodiment, the trailer side walls are partially in parallelism and partially radiused inwardly relative to the geometric center line of the trailer and form top sections at the front and back of the trailer structure. Upon release of the locking or latch means and in folding down the side walls, the trailer structure may be placed in upright position with the rear end supported on the ground to form a support frame or wall for the tent to be erected. A travel cover or segments thereof normally utilized to enclose the trailer interior in the non-collapsed condition of the trailer, may be removed or, alternatively, unfolded and draped over the upright trailer structure and attached thereto by means of snaps to erect the tent, the latter utilizing common tent poles, pegs or stakes or flexible fiberglass poles or rods in the form of bows positioned at the front and rear of the tent. In the erected position, the wire-mesh areas of the trailer structure provide ample ventilation for the interior of the tent, in conjunction with the net side windows and net door or entrance of the tent. A tow arrangement including coupling means for attaching the trailer to a bike, is provided underneath and at the front side of the trailer.

The above and other objects of the invention will be more readily understood from the following description considered in connection with the accompanying drawings in which:

BRIEF DESCRIPTION OF THE DRAWINGS

FIG. 3 is a view similar to FIG. 2, however, illustrating the camper as being collapsed or unfolded;

FIG. 4 is a perspective view of the camper-trailer, illustrating the latter in unfolded condition;

FIG. 10 is a perspective top view of the camper-trailer of FIG. 6, showing the trailer in its non-collapsed condition;

FIG. 11 is a view similar to FIG. 8, illustrating the rear thereof with the trailer in unfolded and upright condition; and FIG. 12 is a perspective view similar to FIG. 5, illustrating a tent erected in combination with the semi-flat trailer structure in accordance with the second embodiment of the invention.

DESCRIPTION OF THE PREFERRED EMBODIMENT

Figure 1:
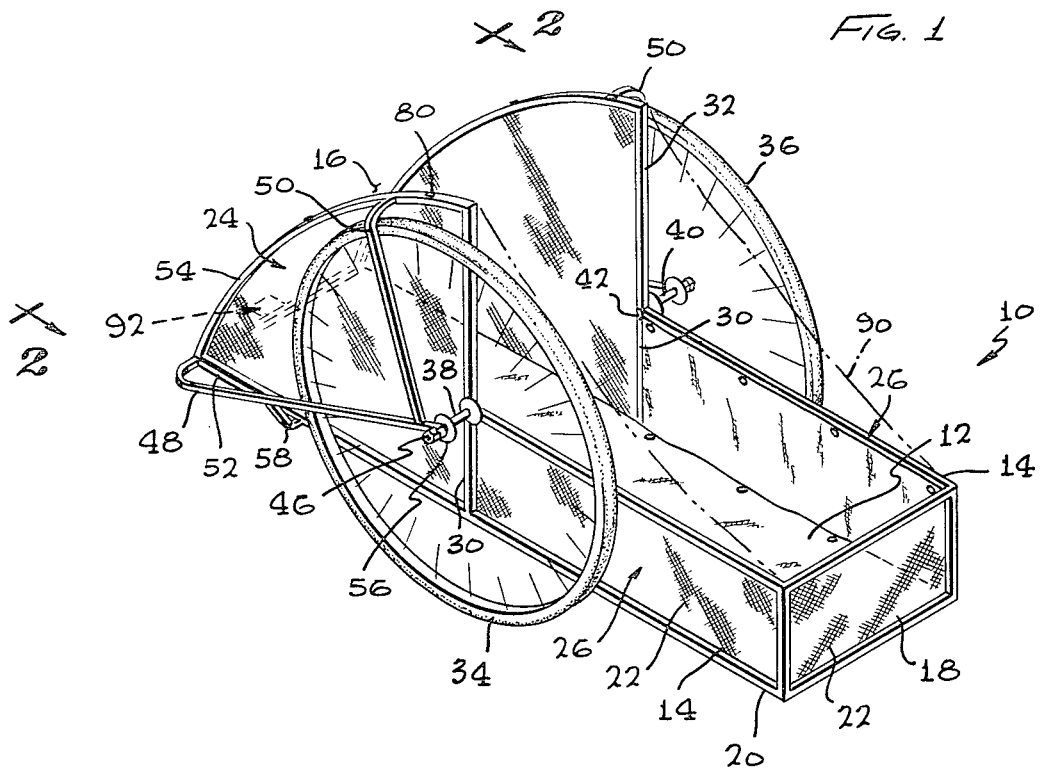
FIG. 1 is a perspective view of the camper-trailer of the invention, the camper-trailer being shown in its non-collapsed condition.
Figure 2:
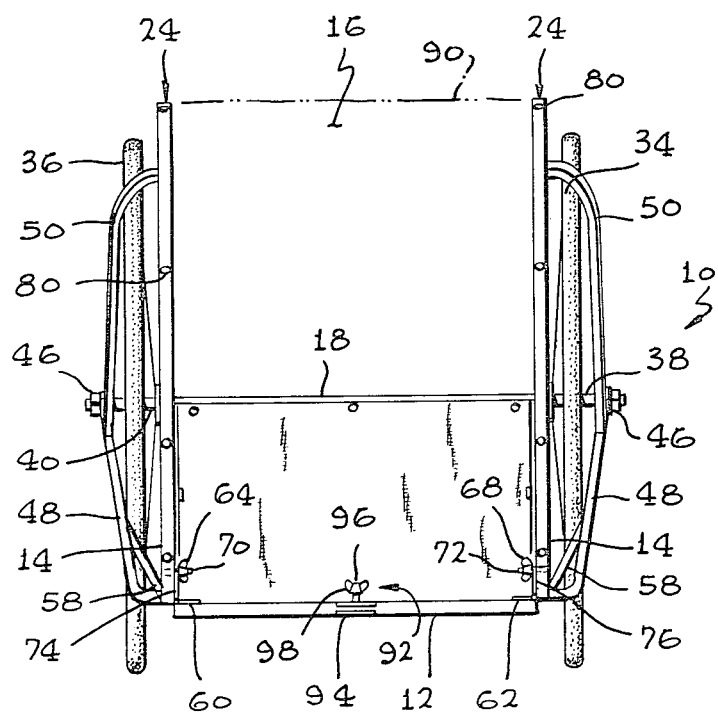
FIG. 2 is an end view taken on the line 2—2 of FIG. 1.

Referring now to the drawings in which like reference numerals index like parts and with attention initially directed to FIGS. 1 and 2, there is shown a camper-trailer, referenced generally by the numeral 10, particularly for use with bicycles.

The camper-trailer 10 is seen to comprise a trailer body of substantial elongation and including a bottom 12, a pair of opposed, parallel side walls 14, an open front end 16, and a closed rear end formed by the wall 18. Typically, the respective surfaces of bottom 12, walls 14 and rear end 18 are formed by a framework of steel tubular bars 20 which, preferably and in order to hold down the weight of the trailer, are thin-walled. Attached to these surfaces with the exception of the bottom, is a thin metallic mesh screen 22. Hence, each of the elements constituting the bottom 12, side walls 14 and rear end 18 represents a light-weight wire-mesh structure.

As may be seen from FIG. 1, the sides 14 comprise a wall portion 24 which is of generally quarter-circular configuration and extends over a substantial section of wall 14. Wall portions 24 merge into rectangular wall positions 26 in direction toward rear end 18. The wall portion 24 and wall portions 26 at their juncture 28 are reinforced by tubular supports 30. Extending in the elongation of the supports 30 are additional tubular support members 32. As shown, both the support members 30 and 32, in the views shown, extend in upright direction, perpendicular to the elongation of the trailer 10 and from the bottom of walls 14 to the top of the quarter-circular wall section 24. Rotatably secured to the upper support members 32, are a pair of wheels 34, 36, the axes of rotation of wheels 34, 36 being aligned and defined by axles 38, 40. Axles 38, 40 extend through the posts or upper support members 32 via holes 42 with the axles 38, 40 extending from the insides of quarter-circular wall sections 24 to the outside of wheels 34, 36. On the inside of wall section 24, the axles 38, 40 are secured by means of nut members 46. Hence, the tubular members 30, 32 form rigid supports for the wheels, at the insides thereof. Further supports are provided by the members 48, 50. As shown, supports 48 are disposed between the wheel axles 38, 40 and the foremost ends of side walls 14 where they are welded to bar members 52 at the lower side of walls 14. By means of the nut members 46, the inner ends of supports 48 are tightly held in position on the axles 38, 40. The supports 50, in the views shown, extend between the acute bar members 54 of wall portions 24 and the support members 48, adjacent the hubs 56 of wheels 34, 36. Typically, the supports 50 are welded to the bar members 54 and support members 48. A third pair of support members 58 are provided between the supports 48 and lower bar member 52 of walls 14. In the manner shown, the supports 30, 32 and 48, 50 and 58, mounted both to the outside as well as to the inside of wheels 34, 36, eliminate excessive vibration and stress and have a stabilizing effect during travel of the trailer.

As shown in FIGS. 2 and 3, side walls 14 are hingedly secured by hinges 60, 62 to bottom 12. Hinges 60, 62 enable the walls 14 to be turned or removed from an upright position shown in FIGS. 1 and 2, to a horizontal or lower position, indicated by the dotted lines A, FIG. 3, in which latter position the walls 14 extend in alignment with bottom 12. To maintain the sides 14 as well as wheels 34, 36 connected to these walls in upright position, a pair of wing nuts 64, 68 are provided. Nuts 64, 68 are threadedly received on a pair of associated bolts 70, 72 which, at this inner ends, are secured to the wall section 24 at the front end of camper-trailer 10. The bolts 70, 72 extend through a pair of locking brackets 74, 76 which are directed upwardly from bottom 12. In positioning nuts 64, 68 on the bolts 70, 72, respectively, and tightening the nuts against brackets 74, 76, the walls 14 are tightly held in place, in upward orientation. In removing nuts 64, 68 from the bolts 70, 72, the latter extend freely through locking brackets 74, 76 and enable side walls 14 to be turned down to the position indicated by lines A, FIG. 3. In this condition, the collapsed trailer assumes a substantially flat configuration, with rear end 18 extending normal to the axes of bottom 12 and side walls 14. This resulting collapsed, flat structure of the trailer provides substantially the geometry of the cross section of an umbrella, serving as a support frame or wall for the tent when the collapsed trailer is placed in upright position with its rear end 18 on the ground, FIGS. 4 and 5. As may be seen from FIGS. 4 and 5, in the unfolded or collapsed condition of the structure, also wheels 36, 36 connected to the side walls 14 via supports 32, are folded and extend in a plane parallel to bottom 12.

Figure 5:
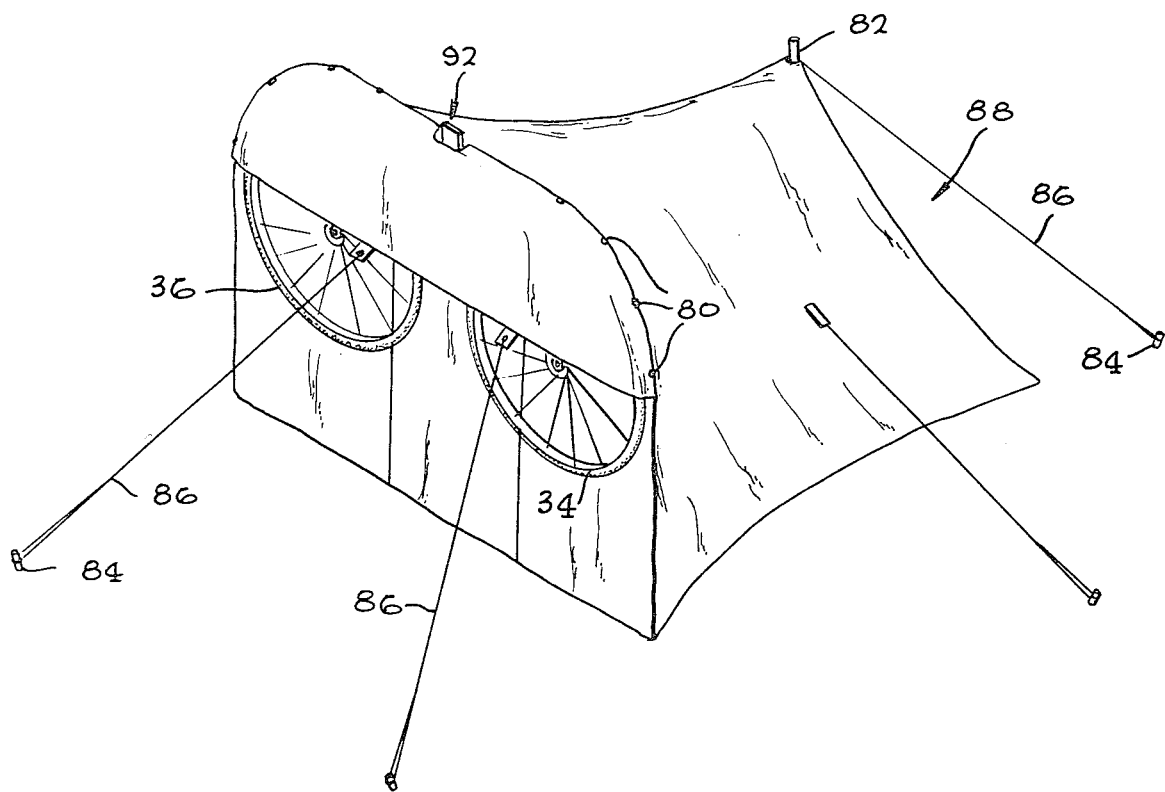
FIG. 5 is a perspective view of the camper-trailer in upright position and illustrating a tent erected in combination with the flat, upright trailer structure according to the first embodiment of invention.

Upon placing the structure in upright position, FIG. 4, a cover 90 of nylon or canvas, or similar suitable material, and which as shown in phantom in FIGS. 1 and 2, is usually carried inside trailer 10, is draped over the upright structure and seamed there to by means of push connections 80, FIGS. 4 and 5. In association with a common tent pole 82, and conventional tent pegs or stakes 84, and tension wires 86, a tent 88 is erected with the wire mesh screens 22 of the sides 14 and bottom 12 FIG. 5, serving as windows. In addition, these screens 22 provide ample ventilation for the interior of tent 88. Typically, the interior surfaces of bottom 12, walls 14 and rear end 18, are provided with a removable lining 90 of a nylon or other suitable material. The lining 90 may be removed, for example, when the collapsed structure is placed in upright position to enable visibility and ventilation through the screens 22.

A tow arrangement 92 FIG. 2, in the form of a bracket 94, a bolt 96 oriented upwardly from bracket 94 and a wing nut 98, is provided at the extreme front of bottom 12 to enable attachment of trailer 10 to a bicycle, not shown.

Typically, and in the preferred embodiment, the width of the trailer structure with the walls 14 in folded-down position is 5 feet while the height of the structure is 4 feet. The width of the bottom 12, per se, is 21".

Referring now to FIGS. 6–12, there is shown a second embodiment of the bicycle camper-trailer of the invention. Having particular reference initially with respect to FIGS. 6, 7 and 10, there is illustrated a camper-trailer 100 of the collapsible type having a main body of substantial elongation and which comprises a bottom 102, sides 104, 106, a top front and top back 108, 110 formed by the sides 104, 106, respectively, an open front 112 and a partially closed rear end 14. Secured to the sides 104, 106 are a pair of axles 116, 118 having rotatably mounted thereon a pair of wheels 120, 122. In order to removably secure the trailer assembly 100 to a bicycle, the former is provided with coupling means 124 enabling the trailer to be attached to a bike, not shown.

Figure 8:
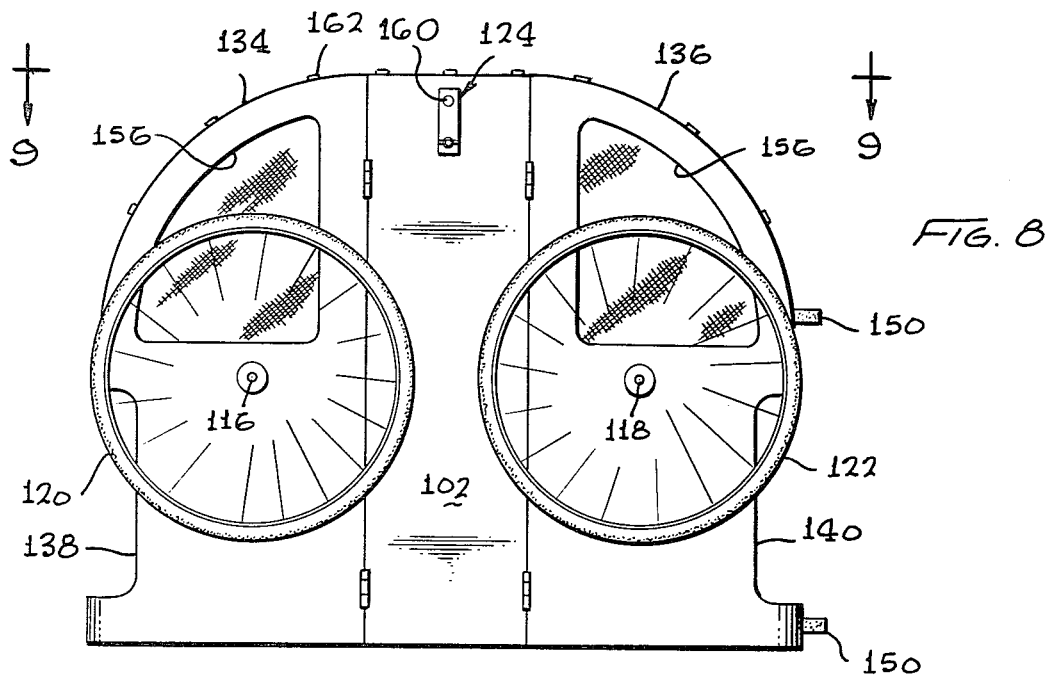
FIG. 8 is a perspective view of the camper-trailer of FIG. 6 shown in its unfolded condition and illustrating the front thereof.
Figure 9:
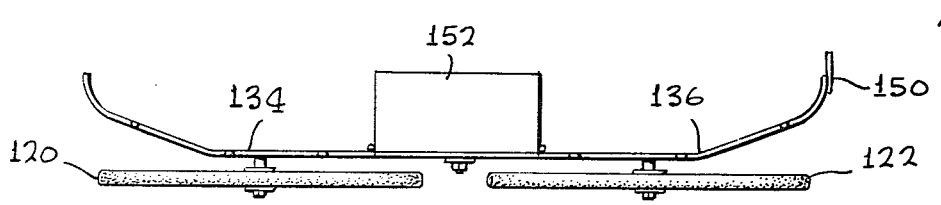
FIG. 9 is a top view taken on line 9—9 of FIG. 8, with the trailer in upright position.

The sides 104, 106, contrary to the embodiment shown in FIGS. 1-5, are partially paralleled and partially radiused, and to this end include lower side portions 126, 128 which extend in parallelism at opposite sides of side walls 104, 106, and upper radiused portions 130, 132 which extend radially inwardly from the parallel portions 126, 128 towards the center of trailer 100. The forward side portions 134, 136, FIGS. 8, 9 and 11, are rounded and have the general geometry of a quarter circle. These rounded side portions 134, 136 of sides 104, 106 extend generally in the longitudinal direction of the trailer. Provided in radiused portions 130, 132 are cutouts 138, 140, disposed toward the rear 114 and in direction longitudinally of trailer 100, FIGS. 6, 8 and 11. In the non-collapsed or assembled condition of the trailer, FIGS. 6, 7 and 10, the curved wall sections 134, 136 and cut outs 138, 140 in sides 104, 106, respectively, provide openings 142, 144, FIGS. 6 and 10, respectively at the front and adjacent the rear of trailer 100 and these openings, as will be appreciated, enable easy access into the trailer interior via the top thereof and, moreover, provide more secure storage of equipment, and the like, within such interior. The uninterrupted curved wall sections 146, 148 of sides 104, 106, intermediate the openings 142, 144 constitute the top front and top back 108, 110 of trailer 100. Typically, the lower parallel side portions 126, 128 extend in parallelism to a point just above wheel axles 116, 118 and thence assume their radiused configuration, FIG. 7. Also, typically, the rounded, quarter circular side section 134, 136 assume their curved configuration adjacent but slightly forwards of axles 116, 118, as may be seen from FIGS. 6 and 8-11. The contacting radiused top sections 146, 148, at their juncture at the approximate center and the back of the trailer top, FIGS. 6 and 10, typically, are coupled or held together by rubber stretch fasteners 150, in conventional manner. Alternatively, strips of a suitable stretch material provided with snap connections, not shown, may be utilized instead of the fasteners 150.

In the second embodiment of the trailer of the invention, the sides, bottom and rear partially closed by a wall 152, are made of a double-layered moldable plastic material having a suitable core sandwiched between the two plastic layers. Such an arrangement, of course, provides for an extremely light-weight trailer structure and, moreover, results in a reduction in the manufacturing cost of the trailer.

Figure 6:
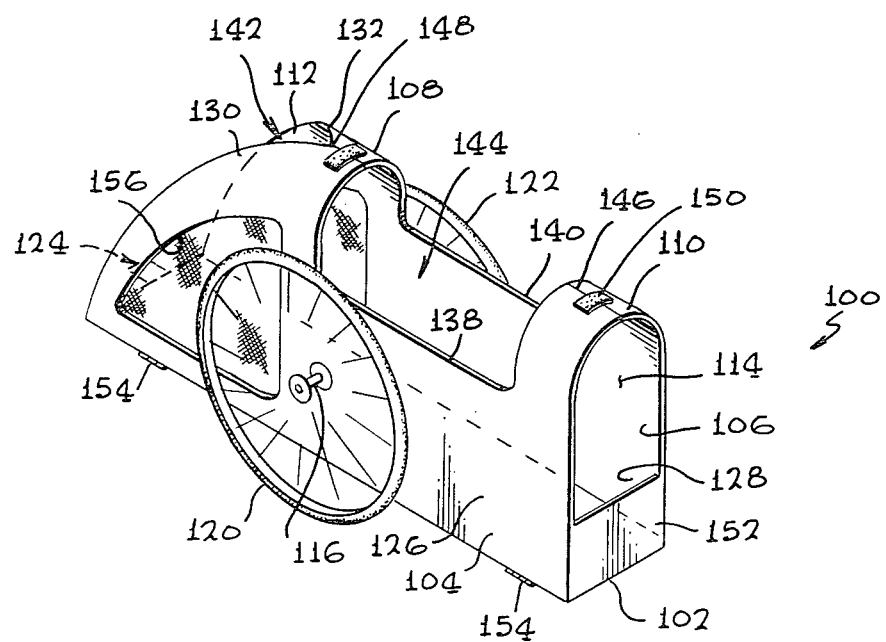
FIG. 6 is a perspective view of a second embodiment of the camper-trailer according to the invention, the camper-trailer being shown in its non-collapsed condition.
Figure 7:
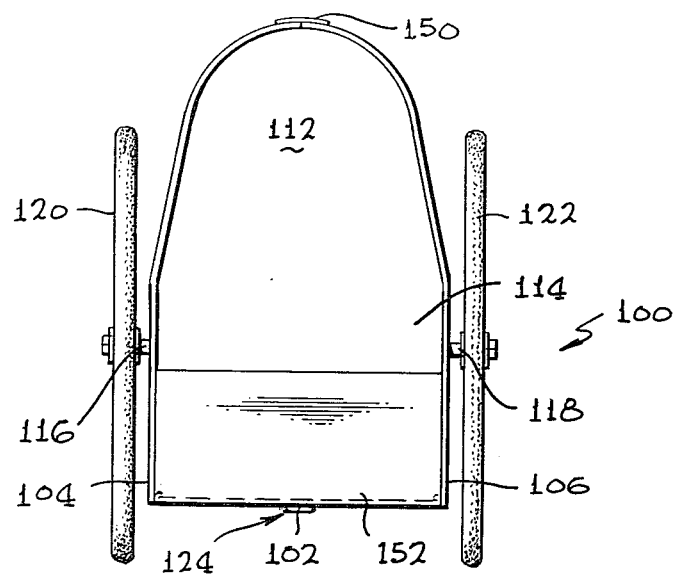
FIG. 7 is an end view taken on line 7—7 of FIG. 6.

In order to position the trailer in its collapsed condition as shown in FIGS. 8, 9 and 11, the trailer bottom 102 and sides 104, 106, are provided by interior connecting hinge members 154, FIGS. 6 and 11. These members 154 may be provided adjacent the extreme front end and rear end of trailer 100. Advantageously in employing the stretch fasteners 150 to interconnect the contacting trailer top portions 146, 148 and the use of hinges 154 at bottom 102 of trailer 100, and further in view of the generally solid yet light-weight plastic construction of the trailer, the axles 116, 118 are held in position on the parallel side sections 126, 128 without any additional form of suupports or bracings for either the wheels 120, 122 or the axles 116, 118, this as opposed to the trailer embodiment of FIGS. 10, where, due to the latch means at the front base of the trailer and due to the wire-mesh structure of the fully parallel walls of the trailer, discrete supports and bracings are required to provide additional support for the trailer wheels.

Provided in the rounded, quarter circular wall sections 134, 136 of sides 104, 106, are wire meshed windows 156, FIGS. 6, 8 and 11, which in the erected position of the tent, FIG. 12, constitute the main circulation vents in the back of the tent. The windows 156 conform closely to the configuration of quarter circular wall sections 134, 136.

Upon release of the stretch fasteners 150 and in subsequently folding down sides 104, 106 relative to bottom 102, FIG. 9, the resulting collapsed structure assumes a generally semi-flat configuration with the wall portions 126, 128 extending parallel to ground and with radiused portions 130, 132 directed in slightly upward, curved orientation relative to side wall sections 126, 128. In the collapsed condition of the tent structure as shown in FIG. 9, the wheels 120, 122 are also folded under and extend in parallelism with trailer bottom 102 and ground. In tilting the collapsed structure to its upright position of FIGS. 11 and 12, wall 152 which is fixedly secured to bottom 102 and extends in a plane normal relative thereto, serves as a support for the collapsed trailer structure, the latter, in the condition, serving as a support frame or back wall for a tent, e.g., the one shown in FIG. 12 and referenced generally by the numeral 158. The trailer hitch or like coupling means 124 is pivotable from a position in which it extends forwardly outwardly from trailer bottom 102 to a position within which is confined to within the boundaries of bottom 102, FIG. 11. To this end, a swivel mount 160 is provided, the arrangement serving to eliminate the necessity of having to provide a hole in the tent top, as in the embodiment of FIGS. 1-5.

Provided along the perimeter of quarter circular side wall sections 134, 136, are the usual snap-bottom connections 162 which enable the back of tent 158 to be secured to the collapsed and upright structure of trailer 150, FIGS. 8, 11 and 12. Provided at the sides adjacent the rear of the trailer are a further pair of snap-button connections by, FIG. 8, which enable a tent flap, e.g., the one shown at 166, FIG. 12, to be securely attached to the sides 104, 106.

A nylon or canvas cover 168 provided with zippers, not shown, and carried inside the trailer interior, is draped over the upright structure, FIG. 12, and fastened thereto by means of the snap-button connections 162. In association with flexible fiberglass and modular support rods 170 in the form of bows, the tent 158 is erected and, in the figure shown, thereby assumes the general shape of a quonset dwelling. The modular support rods 170, as illustrated, are positioned at both sides and the front of the tent. The method of utilizing the rods 170 in the manner indicated, renders the tent completely self-supporting, and olivates the usual need for support lines. This tent construction in conjunction with the upright trailer frame allows mobility when erected and when positioned in place, can be retained in stationary position by means of conventional tent stakes or pegs 172. In the manner described, the tent arrangements is also such that it is self-sustaining when placed in upstanding position, which simplifies the erection or displacement of the tent. Ample ventilation for the tent interior is provided by the side windows 156 in association with net windows 174 contained in the tent sides 176 and the front tent door 178.

While the invention has been shown and described in terms of a preferred embodiment, it will be obvious to those skilled in the art that various substitutions, modifications, omissions, and changes may be made in this embodiment without departing from the scope of the invention.

What is claimed is:

1. A camper-trailer adapted for use with a two-wheeled vehicle, comprising:
   an elongated main body having a bottom, a pair of opposed sides, a front end, and a rear end;
   hinge means intermediate said bottom and said sides for permitting the latter to be moved from a normal substantially upright position to a second lower position in which at least a portion of said sides extends in a plane aligned with said bottom;
   releasable locking means for maintaining said sides in the first upright position;
   a pair of wheels mounted on said sides, whereby upon release of said locking means and displacement of said sides from said first to said second position, said body may be placed in an upright position, serving as a frame for a tent to be erected; and
   wherein said sides define portions extending in parallelism with each other and portions radiused inwardly from said parallel portions toward the center of said body, said radiused portions of said sides each define a cutout formed therein, and wherein the radiused portions adjacent the cutouts constitute contacting portions coupled to each other and forming a top front and top back of said trailer, wherein said contacting portions extend substantially midway and at the rear of said trailer, and wherein said releasable locking means are in the form of stretch rubber fasteners attached to said contacting portions.

2. The camper-trailer of claim 1, wherein said sides at said front end thereof define a forwardly outwardly curved periphery constituting an opening at said front end of said body.

3. The camper-trailer of claim 2, wherein said front end of said body is provided with hitch means for attachment of said trailer to a bike, said hitch means being pivotable from a first position in which said means project from said front end to a retracted position in which said means are confined within the boundary of said bottom at said front end thereof.

4. The camper-trailer of claim 3, wherein said body is made of a modable plastic material.

5. The camper-trailer of claim 4, wherein said plastic material comprises first and superimposed layers and a core sandwiched between said layers.

6. A camper-trailer adapted for use with a two-wheeled vehicle, comprising:
   an elongated main body having a bottom, a pair of opposed sides, a front end, and a rear end;
   hinge means intermediate said bottom and said sides for permitting the latter to be moved from a normal substantially upright position to a second lower position in which at least a portion of said sides extends in a plane aligned with said bottom;
   releasable locking means for maintaining said sides in the first upright position;
   a pair of wheels mounted on said sides, whereby upon release of said locking means and displacement of said sides from said first to said second position, said body may be placed in an upright position, serving as a frame for a tent to be erected;
   said sides defining portions extending in parallelism with each other and portions radiused inwardly from said parallel portions toward the center of said body;
   said body in said collapsed condition thereof defining a substantially semi-flat structure and said pair of wheels being folded beneath said semi-flat structure, and said structure in said collapsed condition of said body assuming the general configuration of the cross-section of a mushroom.

7. A camper-trailer adapted for use with a two-wheeled vehicle, comprising:
   an elongated main body having a bottom, a pair of opposed sides, a front end, and a rear end;
   hinge means intermediate said bottom and said sides for permitting the latter to be moved from a normal substantially upright position to a second lower position in which at least a portion of said sides extend in a plane aligned with said bottom;
   releasable locking means for maintaining said sides in the first upright position;
   a pair of wheels mounted on said sides, whereby upon release of said locking means and displacement of said sides from said first to said second position, said body may be placed in an upright position, serving as a frame for a tent to be erected;
   said sides defining portions extending in parallelism with each other and portions radiused inwardly from said parallel portions toward the center of said body, said sides at said front end defining a portion of substantially quarter-circular configuration, and said portion of substantially quarter-circular configuration having a window formed therein, said window being of a wire mesh structure and facilitating ventilation for the interior of the tent.

8. The camper-trailer of claim 7, wherein said frame in said upright position of said body assumes the general configuration of the cross-section of a mushroom.

9. A camper trailer adapted for use with a two-wheeled vehicle, comprising:
   an elongated main body having a bottom, a pair of opposed sides, a front end, and a rear end;
   hinge means intermediate said bottom and said sides for permitting the latter to be moved from a normal substantially upright position to a second lower position in which at least a portion of said sides extends in a plane aligned with said bottom;
   releasable locking means for maintaining said sides in the first upright position;
   a pair of wheels mounted on said sides, whereby upon release of said locking means and displacement of said sides from said first to said second position, said body may be placed in an upright position, serving as a frame for a tent to be erected, wherein said sides define portions extending in parallelism with each other and portions radiused inwardly from said parallel portions toward the center of said body, wherein said sides have a geometry in the general configuration of a transitionally curved spherical quadrant of an oblong provided with a cutout adjacent the base of the quadrant.

* * * * *